United States Patent [19]
Effinger et al.

[11] 3,786,506
[45] Jan. 15, 1974

[54] DYNAMIC RANGE CONTROL SYSTEM

[75] Inventors: David D. Effinger, La Habra; Norol T. Evans, San Pedro; Vaughn H. Estrick, Fullerton, all of Calif.

[73] Assignee: Hughes Aircraft Company, Culver City, Calif.

[22] Filed: Mar. 10, 1972

[21] Appl. No.: 233,834

[52] U.S. Cl. ............................. 343/7 A, 343/5 GC
[51] Int. Cl. ............................................... G01s 9/06
[58] Field of Search ........................... 343/7 A, 5 GC

[56] References Cited
UNITED STATES PATENTS

| | | | |
|---|---|---|---|
| 3,267,463 | 8/1966 | Olin | 343/7 A |
| 3,599,208 | 8/1971 | Nelson | 343/7 A |
| 3,162,814 | 12/1964 | Aasen et al. | 343/5 GC |

*Primary Examiner*—Benjamin A. Borchelt
*Assistant Examiner*—G. E. Montone
*Attorney*—W. H. MacAllister et al.

[57] ABSTRACT

An automatic dynamic range control system for eliminating dynamic gain limitations that may provide undesirable effects in the moving target indicator or video processor portions of a radar system. A separate auxiliary measurement channel is provided in parallel with the main IF channel having a logarithmic amplifier or sequential logarithmic detector with sufficient dynamic range to meet the signal requirements. At each range bin in the auxiliary channel, the IF signal is quantized in amplitude above the predetermined dynamic range of the main channel by selecting relatively large input signal level ranges which, in the system, provides a relatively low quantizing accuracy without substantially decreasing the system reliability. The quantized levels are then passed through a switch which selects the last PRF interval used for a fill pulse (such as in an MTI system) and places the quantized signals into a 1/PRF shift register. The quantized levels are then used in subsequent sweeps of the dwell period during each range bin to attenuate signals in the main IF channel that would be limited by gain characteristics of that channel. By utilizing predetermined gain control quantized values for an entire dwell period, undesired amplitude modulations that may affect the moving target indicator or processing operation are eliminated.

12 Claims, 4 Drawing Figures 3,786,506

DYNAMIC RANGE CONTROL SYSTEM

BACKGROUND OF THE INVENTION

1. Field of the Invention

This invention relates to radar automatic gain control systems and particularly to an automatic dynamic range control system that operates to overcome the dynamic range limitations of a radar channel, without introducing undesired amplitude modulations.

2. Description of the Prior Art

Radar systems utilizing digital MTI or doppler processing characteristically have dynamic range limitations in the main IF channel such as in the analog to digital converter which clips the signal, thus causing a loss of target or tracking information. If the signal is limited in the radar channel, the possible combining of clutter energy signals may cause erroneous detection of clutter energy as target energy. Another problem with limiting in the radar channel is that amplitude information may be lost that is required for accurate tracking and for reliable beam splitting. If a conventional instantaneous automatic gain control system is utilized, the amplitude modulation on the top of the signal is substantially eliminated, resulting in the inability to reliably detect targets. Thus, in radar systems, and especially in digital processor type radar systems, the limited dynamic range of the IF channel results in a considerable degree of inaccurate and unreliable operation.

It is therefore an object of this invention to provide an improved radar system that substantially eliminates the undesired effects of limited dynamic ranges of operation in the radar channels.

It is another object of this invention to provide an improved and reliable digital moving target indicator system.

It is another object of this invention to provide a large dynamic range radar system which operates by retaining a maximum of signal information.

It is a further object of this invention to provide a gain control unit for radar system channel which operates to substantially eliminate limiting or clipping of the radar signal.

BRIEF DESCRIPTION OF THE DRAWINGS

These and other objects, features and advantages of the invention itself will become apparent to those skilled in the art, in the light of the following detailed description, taken in consideration with the accompanying drawings wherein like reference numerals indicate like or corresponding parts throughout the several parts.

DETAILED DESCRIPTION OF THE INVENTION

Figure 1:
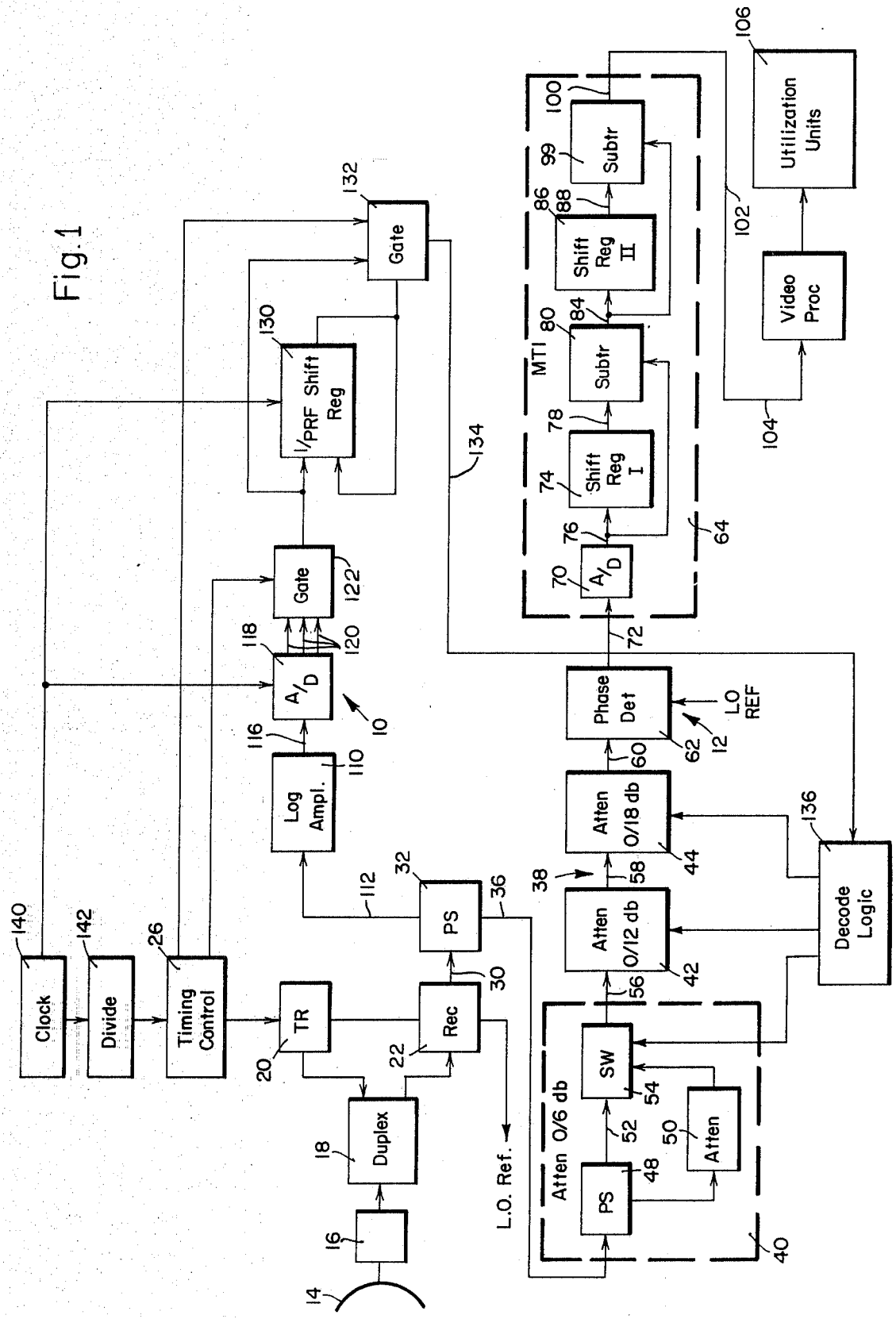
FIG. 1 is a block diagram of the improved dynamic range control system in accordance with the invention.

The system of the invention includes an auxiliary channel 10 utilized to control the gain in a main channel 12 illustrated as an IF channel but which in some arrangements of the invention may be at other frequencies, such as at RF (radio frequency). The radar system includes an antenna 14 which may be a planar array or a parabolic dish, for example, and an antenna control circuit 16 which may include microwave connections and scan control units coupled to a suitable duplexer 18 which, as is well known in the art, is then coupled to a transmitter 20 and a receiver 22. Pulses of energy are transmitted into space from the transmitter 20 in response to a timing control circuit 26 and intercepted energy is then applied to the receiver 22 and converted to IF (intermediate frequency) signals in a conventional manner and applied through a lead 30 to a suitable power splitter 32. The IF signal on the lead 30 may, for example in the illustrated system, have a dynamic range of 74 db and the channel 12 may have a limited dynamic range of, for example, 50 db. Dynamic range is defined as the ratio of the specified maximum signal level capability of the system or components to its noise level. Each signal has dynamic range requirements for providing a desired amount of amplitude information. Thus, dynamic range which may be expressed in decibels, is a measure of the value of the S/N (signal to noise) ratio over which a system or component can operate. The IF signal is then applied from the power splitter 32 through a lead 36 to an attenuator unit 38 which may include attenuators 40, 42, and 44 coupled in series and respectively providing an attenuation of 0 or 6 db, of 0 or 12 db, and of 0 or 18 db. The attenuator 40, for example, includes a power splitter 48 coupled to the lead 36 to apply energy through a 6 db attenuator 50 when a switch 54 is conductive in a first position, or through a lead 52 and the switch 54 to an output lead 56 when the switch is in a second position. The lead 56 then selectively passes the signal through a similar attenuator element of the attenuator 42 which in turn passes the signals through a lead 58 to a similar attenuator element depending on a switch position of the attenuator 44.

The signal is then applied through a suitable lead 60 to a phase detector 62 and in turn to an MTI unit 64, which may be either a conventional moving target indicator (MTI) unit as shown, or may be an in phase and in quadrature target indicator unit. The phase detector 62 receives a local oscillator (L.O.) reference signal from the receiver 22, as is well known in the art. If quadrature MTI is utilized, the phase detector 62 is a synchronous phase detector, as is well known in the art, providing detection at two phases 90° separated from each other. In a quadrature system the phase detector has two outputs (I & Q) and therefore two parallel moving target indicator systems would be used, as is well known in the art. The illustrated MTI unit 64 includes an analog-to-digital converter 70 responsive to the video signal on a lead 72 as provided by the phase detector 62. A first stage of the MTI unit 64 includes a shift register 74 responsive on a lead 76 to the A to D converter 70 applying a signal, range bin by range bin through a lead 78 to a first subtractor 80, also receiving the input signal on the lead 76. As is well known in the art, the shift register may have a total delay of a range sweep providing comparisons and applying a residue from the subtractor 80 to a lead 84 and, in turn, to a second shift register 86. The signal delayed in the shift register 86 after a range sweep delay is applied on a range bin to range bin basis to a subtractor 99, in combination with the undelayed signal on the lead 84 to provide a second reside along with the target signal on a lead 100 which is applied to a video processor 102. The video signal after processing then may be applied through a lead 104 to a suitable utilization unit 106 which may, for example, include displays and aircraft control circuitry, as are well known in the art.

The main IF channel 12 may have a substantial limitation of dynamic range, which is illustrated as 50-$db$ and may be caused, for example, by the A to D converter 70, the phase detector 62 and other amplifiers that may be required in the channel. The auxiliary channel 10 includes a logarithmic amplifier or sequential logarithmic detector 110. As is well known in the art, logarithmic amplifiers or detectors use successive detection over predetermined ranges of gain to provide a wide dynamic range. A sequential detector that may be utilized in the system of the invention is shown, for example, on pages 5-34 of the book "Radar Handbook," by Merril I. Skolnik, copyright 1970 and published by McGraw Hill Book Company. The logarithmic amplifier 110, which is coupled from the power splitter 32 by a lead 112, has at least the required dynamic range of the IF signal which, for example, may be 74 $db$. The amplified signal is applied from the log amplifier 110 through a lead 116 to an analog-to-digital converter 118 which detects the amplitude of the signal relative to 47 $db$ and generates or encodes three bit quantized output digital signals on a composite lead 120, which signals are applied to a gate or switch 122. It is to be noted that the reference level is taken at 47 $db$ rather than 50 $db$ because the system of the invention allows a low level tolerance of selection of the dynamic range correction. In order to reduce the accuracy requirements of the quantization circuits of the A to D converter 118, the following levels are selected:

| Input Signal Level | Quantized Output | Attenuation |
|---|---|---|
| S < 47db | 000 | 0 db |
| 47db ≤ S < 53db | 001 | 6 db |
| 53db ≤ S < 59db | 010 | 12 db |
| 59db ≤ S < 65db | 011 | 18 db |
| 65db ≤ S | 100 | 24 db |

As can be seen by the above table, each input signal range above 47 $db$ has a corresponding attenuation that will be inserted in the main IF channel 12. The gate 122, which in response to the timing control circuit 26 passes the encoded data of the last PRF interval used for a fill pulse, into a shift register unit 130 or 1/PRF register which has a delay of one radar sweep.

During the process time as determined by the timing control circuit 26 the contents of the shift register 130 are applied range bin by range bin through a gate 132 and, in turn, through a composite lead 134 to a decode logic circuit 136. In response to the three bit code on the lead 134, the logic decode circuit 136 energizes different combinations of the attenuators 40, 42, and 44 to provide the required degree of attenuation to the IF signal on the lead 36. A clock 140 may be provided to control the digital operation throughout the system and apply clock signals to a divide circuit 142, which in turn applies signals to the timing control 26 for controlling the time of transmission, the gating of the gate 122 and the processing time.

Figure 2:
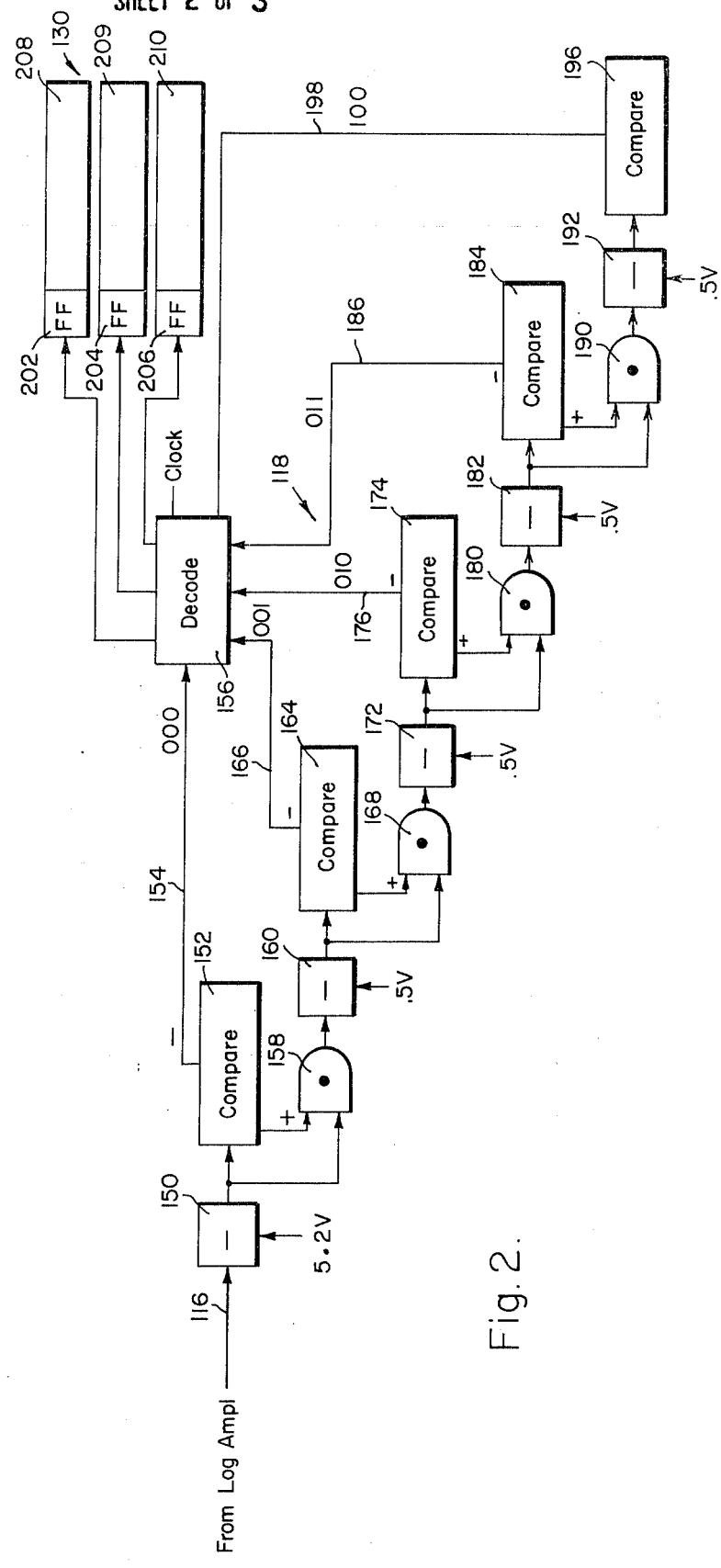
FIG. 2 is a schematic block diagram of an example of an analog to digital encoder or analog to digital converter that may be utilized in the system of FIGS. 1a and 1b.

The A to D converter 118 may be of any suitable type responsive to a number of voltage ranges such as illustrated in FIG. 2, in which the analog input voltage on the lead 116 is applied to a subtractor 150 also receiving a reference voltage of 5.2 volts. In the illustrated arrangement it is assumed that the log scale factor is 10 $db$ per volt, so that 0 $db$ is equal to 0.5 volts, 10 $db$ is equal to 1.5 volts, and 20 $db$ is equal to 2.5 volts. As a result, the quantized outputs are determined from the following voltage ranges:

| | |
|---|---|
| 5.2 volts (47 db) | 000 |
| 5.2v–5.8v | 001 |
| 5.8v–6.4v | 010 |
| 6.4v–7.0v | 011 |
| 7.0v–up | 100 |

The signal at the output of the subtractor 150 is then applied to the compare circuit 152 to determine if the output is positive or negative, and if it is negative, the signal is applied on a lead 154 representing 000 to a decode circuit 156. If the output of the circuit 150 is positive, an AND gate 158 responds to the positive condition to gate the voltage signal to the subtractor 160, which subtracts another 0.5 volts and applies the remainder to a compare circuit 164. If the signal is negative, a lead 166 applies a signal to the decode circuit 156 representative of a 001 condition, and if the output of the circuit 160 is positive, an AND gate 168 applies the voltage to a subtractor circuit 172 which again subtracts 0.5 volts. If the remainder from the circuit 172 is negative as determined by a compare circuit 174, the signal representative of 010 condition is applied to a lead 176 to the decode circuit 156. If the remainder is positive, an AND gate 180 applies the remainder to a subtractor circuit 182 which again subtracts 0.5 volts therefrom. If the output from the circuit 182 is negative, a compare circuit 184 applies a signal representative of a 011 condition to a lead 186 which is in turn applied to the decode circuit 156. If the signal developed by the subtractor 182 is positive, an AND gate 190 applies the voltage to a subtractor 192, which again subtracts 0.5 volts from the signal value and applies a signal to a compare circuit 196. If the difference is negative, the compare circuit 196 applies a signal on a lead 198 representative of a 100 condition to the decode circuit 156. A clock pulse from the clock 140 may be utilized with a suitable delay to gate the detected results during each range bin through the decode circuit 156.

The decode circuit 156 responds to the true or false conditions of each of the leads 154, 166, 176, 186, and 198 to set flip-flops 202, 204, and 206 of respective shift registers 208, 209, and 210 of the shift register unit 130. Thus, the subtraction and comparison operation of the circuit of FIG. 2 may be timed in response to clock pulses to rapidly set the flip-flops 202, 204, and 206 during each range bin period. In other arrangements in accordance with the invention, several range bins delays may be provided in the A to D converter 118.

Referring now principally to FIG. 1, the decode logic unit 136 responds to the input code by controlling the attenuators 40 42, and 44, respectively represented by A, B, and C in accordance with the following table:

| CODE | DECODE UNIT |
|---|---|
| 001 | $\overline{A}$ $\overline{B}$ $\overline{C}$ |
| 010 | $\overline{A}$ $\overline{B}$ C |
| 011 | $\overline{A}$ B C |
| 100 | A $\overline{B}$ C |

Thus, it can be seen that each required attenuation condition is provided by the three attenuators of the attenuation unit 38.

Figure 3:
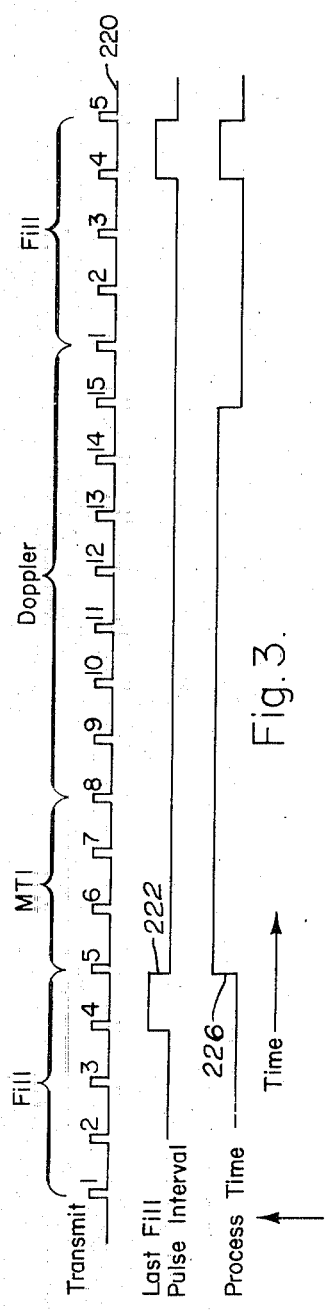
FIG. 3 is a schematic diagram of waveforms of voltage as a function of time for explaining the operations of the system of FIGS. 1a and 1b.

Referring now also to the waveforms of FIG. 3, the transmit pulses of the waveform 220 may be provided by the transmitter 20 as continuous pulses which repetitively may have a sequence of four fill pulses, three MTI pulses for the illustrated two-stage canceller, 8 pulses for making doppler determination, followed by the same sequence. In some arrangements within the scope of the invention, different transmit periods or sequences of fill pulses may be at different pulse repetition frequencies. As is well known in the art, when utilizing an MTI system or a doppler filter system, four fill pulses are provided to obtain a total sample of the clutter so the proper and total cancellation is provided. During the last fill pulse interval, a pulse of a waveform 222 may be developed by a continuous repetitive sequence in the timing control circuit 26 to close the gate 122, so that the sampled amplitude code from the A to D converter 118 is applied to the shift register 130 during that entire range sweep period in a range bin by range bin fashion over the entire range of operation of the system. After the shift register 130 is filled and at the beginning of the next transmit pulse, a process time pulse of a waveform 226 is provided by a fixed repetitive sequence in the timing control circuit 26 to close the gate 132 to provide the attenuation of the attenuator unit 38 as a function of the excess dynamic amplitude sampled during the range sweep after the fourth transmitted pulse. It should be noted that if new data were used in each PRF interval instead of using one PRF interval of data to control the entire dwell period, moving targets may be degraded or eliminated.

For example, if a moving target at optimum radial velocity causes a 6 $db$ modulation on the clutter input signal amplitude on a pulse-to-pulse basis, the signal plus clutter is larger than +50 $db$ above RMS noise, and an instant automatic gain control circuit would eliminate this AM modulation and substantially eliminate the target. Thus, the use of a 1/PFR memory circuit in the system in accordance with the invention provides a substantial detection and tracking advantage. For a combination moving target indicator and range gated pulse doppler processor, the register is loaded once and its contents are then used to control the gain for the remainder of the dwell period in accordance with the invention. It is to be understood that the invention is not limited to any particular number of fill pulses, but is applicable wherever a specific pulse may be utilized during an operation period to provide highly reliable MTI or doppler operation.

Figure 4:
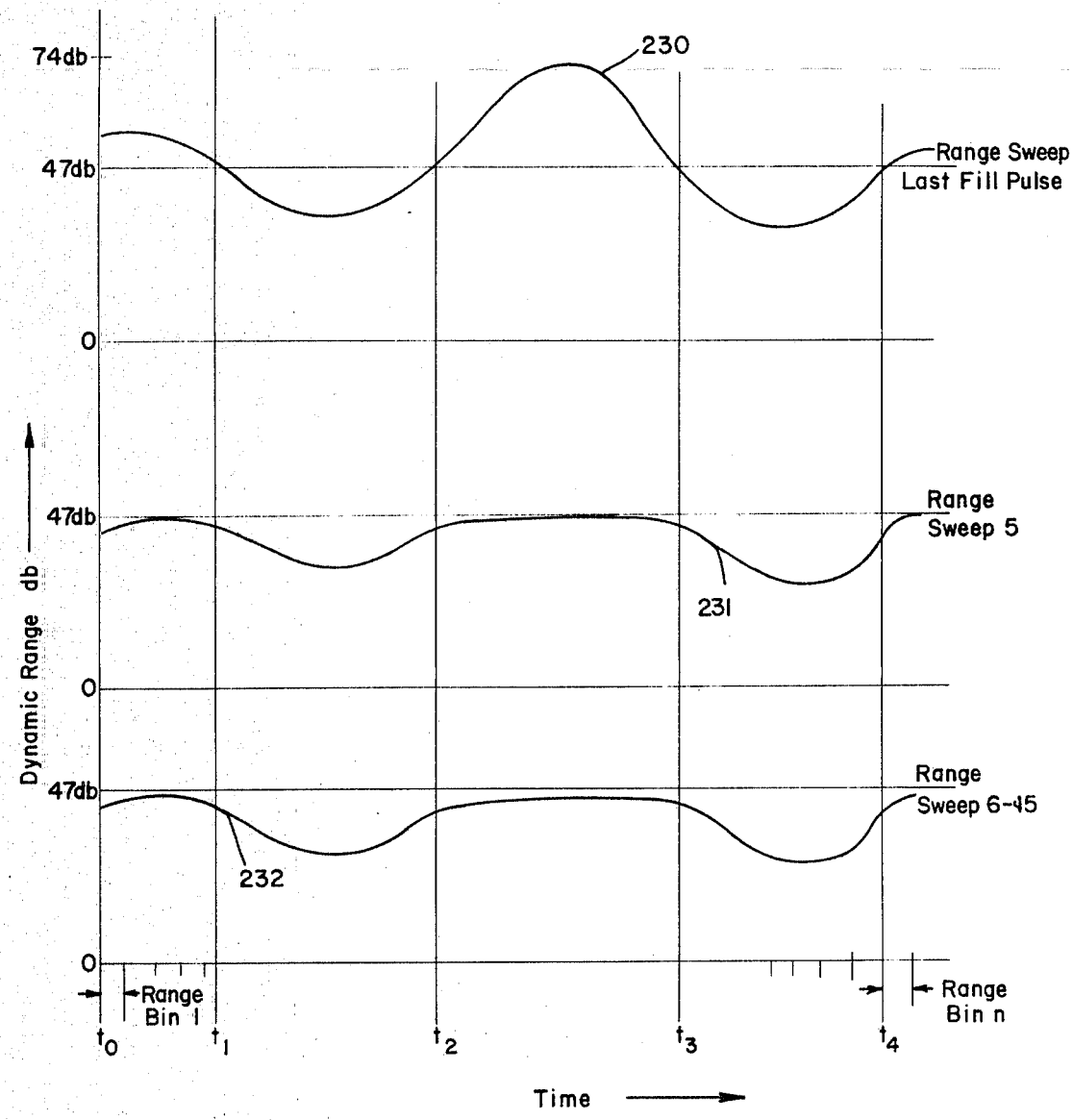
FIG. 4 is a schematic diagram of waveforms showing dynamic range as a function of time for further explaining the attenuation operation of the system of FIGS. 1a and 1b.

Referring now principally to FIG. 4 as well as to FIGS. 1 and 3, signals 230, 231, and 232 show the amplitude of the IF signal during range sweeps 1 to 15, as indicated in FIG. 3. During the range sweep of the last fill pulse, a signal of the waveform 230 shows the IF signal amplitude for range bin 1 to range bin $n$, with $n$ being the total number of range bins utilized in the system. During approximately the first four range bins between times $t_o$ and $t_1$, the IF signal of the waveform 230 exceeds 47 $db$ in amplitude and coded signals are stored in the shift register 130 representing that amplitude range. During the next group of range bins between times $t_1$ and $t_2$, the amplitude of the IF signal of the last fill pulse is below the 47 $db$ level so that no attenuation is required and a series of 000 values are stored in the shift register 130. During the range bins between times $t_2$ and $t_3$, the signal has an amplitude greater than 47 dbs so that coded attenuation values are stored in the shift register 130. During the range bins between times $t_3$ and $t_4$ of the last fill pulse range sweep, the signal level is below the 47 $db$ level and 000 codes are stored in the shift register 130, indicating that an attenuation of the radar signal is not required.

During the next range sweep, which is range sweep 5, the coded signals are applied during each range bin to the decode logic circuit 136 so that during the range bin between times $t_0$ and $t_1$ the signal is attenuated below the 47 $db$ level, during the range bins $t_1$ to $t_2$ the signal is unchanged, between the range bins between times $t_2$ and $t_3$ the signal is attenuated below the 47 $db$ level, and between the time range bins of times $t_3$ to $t_4$ the signal is unattenuated. Thus, it can be seen that the attenuation only has an effect when the signal as sensed in the auxiliary channel 10 exceeds the dynamic range limitation of the main channel 12. During the subsequent sweeps of the dwell period, sweeps 6 to 15, the signal is controlled in a similar manner as indicated by the waveform 232. Thus, the system utilizes the sampled dynamic range for the subsequent range sweeps of the dwell period, which is the period that the same area in space is illuminated, so that undesired amplitude modulations are not provided.

It is to be understood that the illustrated dynamic range of the main IF channel and the auxiliary channels has only been selected for explanatory purposes and the invention is not to be limited to any particular dynamic ranges, but the principles are applicable to any system in which some limitation of the dynamic range may be provided in the main channel.

Thus there has been provided an automatic dynamic range control system to provide gain control in a digital MTI or doppler system to prevent either limiting in the IF circuits or in the RF circuits, such as may occur in the A to D converters. An automatic gain control system is provided that does not eliminate the desired signal modulations as a result of storing the amplitude during a selected pulse of the operating cycle. By applying the same gain control function on each PRF interval of a plurality of intervals of the dwell period, AM modulation is prevented from being introduced into the MTI residue. The use of an auxiliary large dynamic range logarithmic channel for measurement purposes allows the gain control function to be applied to the exact range that is required in the main channel, instead of some finite time after the large signal, as in the case of a conventional automatic gain control system. The system has been found to operate reliably by utilizing a relatively large increment of quantizing accuracy. The system is equally applicable to MTI or other radar systems, such as a monopulse tracking system.

What is claimed is:

1. A dynamic range control system responsive in a radar system to an input radar signal having a predetermined dynamic range comprising a first channel responsive to said input radar signal and having a limited dynamic range less than said predetermined dynamic range, attenuation means included in said first channel, a second channel responsive to said input radar signal, said second channel being characterized by the absence of attenuation means and having a dynamic range of operation to include the predetermined dynamic range of said input radar signal, first means in said second channel for sampling and storing the amplitude characteristics of said input radar signal which is not attenuated during a selected range sweep, and second means coupled to said first means in said second channel and to said attenuation means in said first channel for controlling said attenuation means to selectively attenuate the input radar signal to which said first channel is responsive only as a function of the amplitude characteristics of the input radar signal stored in the first means of said second channel, and for inhibiting said attenuation means from attenuating said input radar signal in said first channel when the amplitude characteristics of said input radar signal are indicative of an input radar signal which is substantially within the limited dynamic range of said first channel.

2. The system of claim 1 in which the first means for sampling stores a code representative of the signal dynamic range substantially above the dynamic range of said first channel so that the signal in said first channel is only attenuated if its dynamic range is above the limited dynamic range thereof.

3. The system of claim 2 in which said second channel includes logarithmic means for providing an output which is a logarithmic function of the input radar signal applied to said second channel.

4. The system of claim 3 in which said first means includes an encoder and a shift register and in which timing means is provided so that a code is stored in said shift register during a selected range sweep for controlling said attenuation means.

5. The system of claim 4 in which gating means is included in said first means responsive to said timing means so that during a first range sweep period the code is stored and said attenuation means is controlled from the stored code during a predetermined number of subsequent range sweeps.

6. The system of claim 5 in which said radar system has a repetitive sequence of a selected number of fill pulses and a selected number of operation pulses and in which said switching means includes a first gate coupled between said encoding means and said shift register and controlled by said timing means in response to a range sweep defined by a selected fill pulse and a second gate coupled between said shift register and said attenuation means for applying the stored code on a range bin basis to said attenuation means during range sweeps defined by the subsequent operation pulses.

7. In a radar system having a repetitive sequence of transmitting a selected number of fill pulses following by a selected number of operational pulses each defining a range sweep and having a sequence of range bin periods during each range sweep, and in which said radar system includes a radar channel including attenuation means, said radar channel being responsive to an input radar signal and having a limited dynamic range, a dynamic range control system for controlling the attenuation of input radar signals in said radar channel comprising logarithmic amplifier means responsive to said radar signal, an analog-to-digital converter coupled to said logarithmic amplifier means for developing coded signals during each range bin period, storage means coupled to said analog-to-digital converter means for storing said coded signals, attenuation control means coupled to said attenuation means in said radar channel and to said storage means for controlling said attenuation means to attenuate the input radar signal in said radar channel as a function of the coded signals stored in said storage means, and control means coupled to said storage means for providing control to store said coded signals during a range sweep defined by the last fill pulse and applying said stored coded signals to said attenuation means during each range sweep defined by the following operational pulses.

8. The system of claim 7 in which said analog-to-digital converter develops a coded signal of predetermined values during each range bin period and in which said attenuation control means includes decoding means responsive to said stored coded signal to attenuate said radar signal during range bin periods when said radar signal is limited by the dynamic range of said radar channel.

9. The system of claim 8 in which said storage means includes a first gate between said analog-to-digital converter means and said storage means for transferring the coded signals to said shift register during the range sweeps defined by the last fill pulses, in which said storage means is a recirculating shift register and in which said storage means also includes a second gate coupled between said shift register and said decoding means for applying signals representative of the stored codes during the range sweeps defined by the operational pulses.

10. A radar system having transmitting and receiving means comprising a first channel coupled to said receiving means for receiving an IF signal, attenuation means coupled in said first channel, moving target indicator means coupled in said first channel, a second channel coupled to said receiving means for receiving said IF signal, sequential detector means included in said second channel, encoding means included in said second channel and coupled to said sequential detector means, and storage means included in said second channel and coupled to said encoding means for storing coded signals during a selected range sweep and coupled to said attenuation means for controlling the IF signal in said first channel during a selected plurality of range sweeps.

11. In a radar of the type including a radar receiver channel responsive to an input radar signal having a predetermined dynamic range, said radar receiver channel being characterized by a limited dynamic range, smaller than the predetermined dynamic range of said input radar signal, an arrangement comprising logarithmic means responsive to said input radar signal for providing an output signal which is a function of the unattenuated input radar signal, said logarithmic means having a dynamic range including said predetermined dynamic range, first means coupled to said logarithmic means for storing any one of a plurality of codes as a function of the amplitude of said output signal, attenuation means in said receiver channel for selectively attenuating the input radar signal in said receiver channel, and second means coupled to said first means and to said attenuation means in said receiver channel for controlling said attenuation means to attenuate the input radar signal in said receiver channel as a function of said codes.

12. The system of claim 11 wherein said first means include means for storing a first code when said output signal is below a preselected level and for storing N other codes when the output signal level is in any one of N different level intervals above said preselected level, and said second means inhibit said attenuation means from attenuating said input radar signal in said receiver channel in response to said first code, and control said attenuation means to attenuate tne input radar signal in said receiver channel by fixed different factors in response to said N codes, respectively.

* * * * *